United States Patent
Pattnaik et al.

(10) Patent No.: US 11,950,199 B2
(45) Date of Patent: Apr. 2, 2024

(54) NETWORK NODE AND METHOD PERFORMED THEREIN FOR CONTROLLING TRANSMISSION

(71) Applicant: Telefonaktiebolaget LM Ericsson (publ), Stockholm (SE)

(72) Inventors: Debashish Pattnaik, Shanghai (CN); Liangliang Guo, Shanghai (CN); Songmao Li, Shanghai (CN); Erqun Sun, Shanghai (CN)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 312 days.

(21) Appl. No.: 17/594,529

(22) PCT Filed: Apr. 24, 2019

(86) PCT No.: PCT/CN2019/084018
§ 371 (c)(1),
(2) Date: Oct. 21, 2021

(87) PCT Pub. No.: WO2020/215230
PCT Pub. Date: Oct. 29, 2020

(65) Prior Publication Data
US 2022/0201641 A1    Jun. 23, 2022

(51) Int. Cl.
*H04W 60/04* (2009.01)
*H04W 60/00* (2009.01)

(52) U.S. Cl.
CPC .............................. *H04W 60/005* (2013.01)

(58) Field of Classification Search
CPC ... H04W 60/005; H04W 60/04; H04W 60/06; H04L 65/1016; H04L 65/1073; H04L 67/54; H04L 67/55
See application file for complete search history.

(56) References Cited

U.S. PATENT DOCUMENTS

| 2018/0198830 | A1  | 7/2018  | Wallis |
| 2022/0394651 | A1* | 12/2022 | Sun ..................... H04L 65/1104 |

FOREIGN PATENT DOCUMENTS

| CN | 101997828 A    | 3/2011 |           |
| CN | 104735664 A    | 6/2015 |           |
| EP | 2997695 A1 *   | 3/2016 | ......... H04L 12/1407 |
| WO | 2016134791 A1  | 9/2016 |           |
| WO | 2018121875 A1  | 7/2018 |           |

OTHER PUBLICATIONS

WO/2016/141970 A1 (Year: 2016).*

(Continued)

*Primary Examiner* — Siu M Lee
(74) *Attorney, Agent, or Firm* — Nicholson De Vos Webster & Elliott LLP

(57) ABSTRACT

A method performed by a network node for handling a communication session in a wireless communication network. The network node receives from a user equipment (UE) a registration message for re-registering the UE to a session. The network node further verifies the registration message based on registration information previously stored for the UE When verified in response to the reception, transmits back to the UE, a registration response along with a terminating request for a call establishment.

18 Claims, 13 Drawing Sheets

(56) References Cited

OTHER PUBLICATIONS

C. Holmberg et al., "Push Notification with the Session Initiation Protocol (SIP), draft-ietf-sipcore-sip-push-20," Oct. 19, 2018, 30 pages, SIPCORE Working Group, Internet-Draft, IETF Trust and the persons identified as the document authors.

Ericsson et al., "Support Push Notifications in IMS to Enable IMS Downloadable Applications," Feb. 25-Mar. 1, 2019, SA WG2 Meeting #130, S2-1901469, Tenerife, Santa Cruz.

3GPP TS 38.300 V15.2.0, "3rd Generation Partnership Project; Technical Specification Group Radio Access Network; NR; NR and NG-RAN Overall Description; Stage 2 (Release 15)," Jun. 2018, 87 pages, 3GPP Organizational Partners.

\* cited by examiner

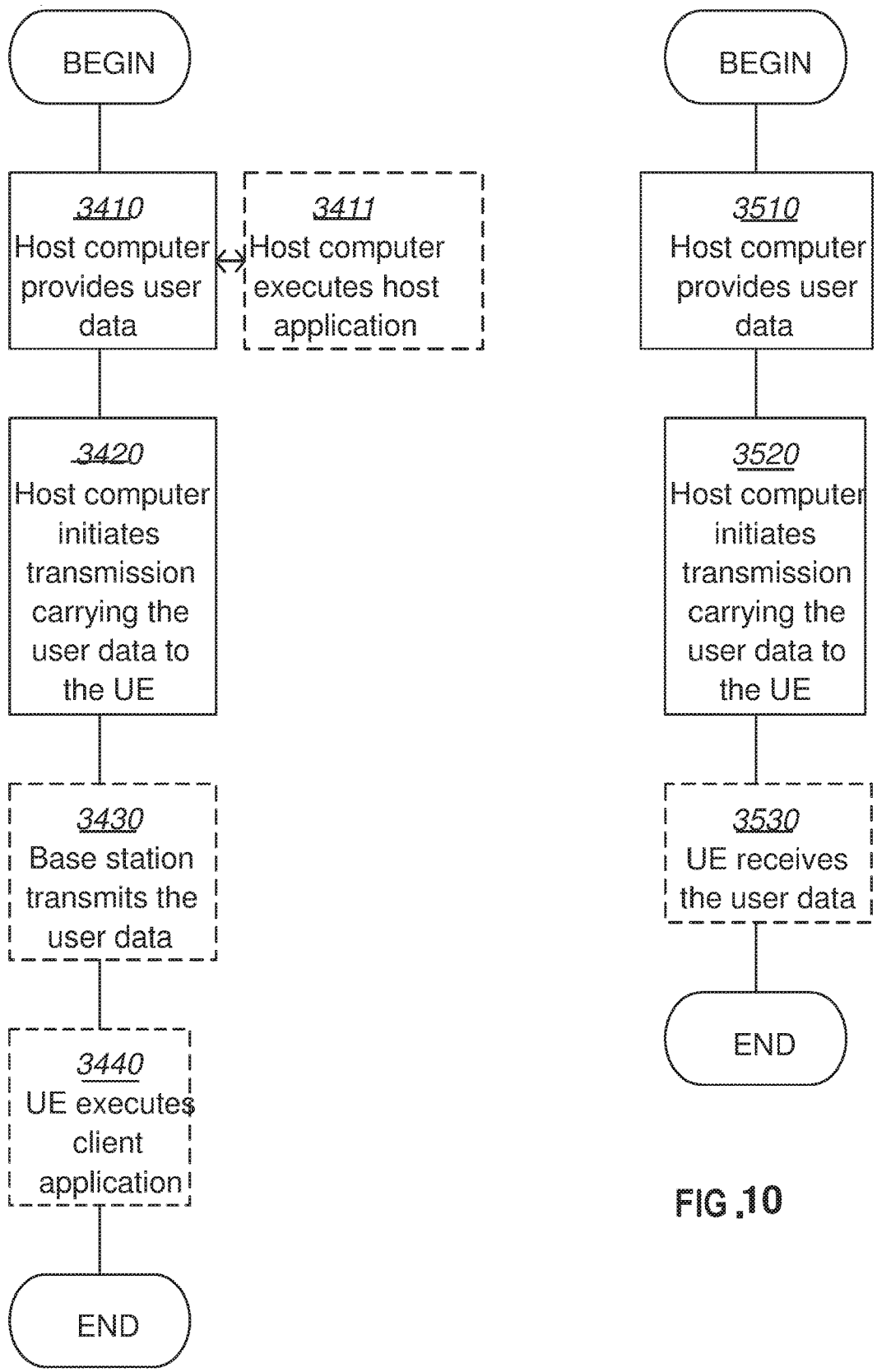

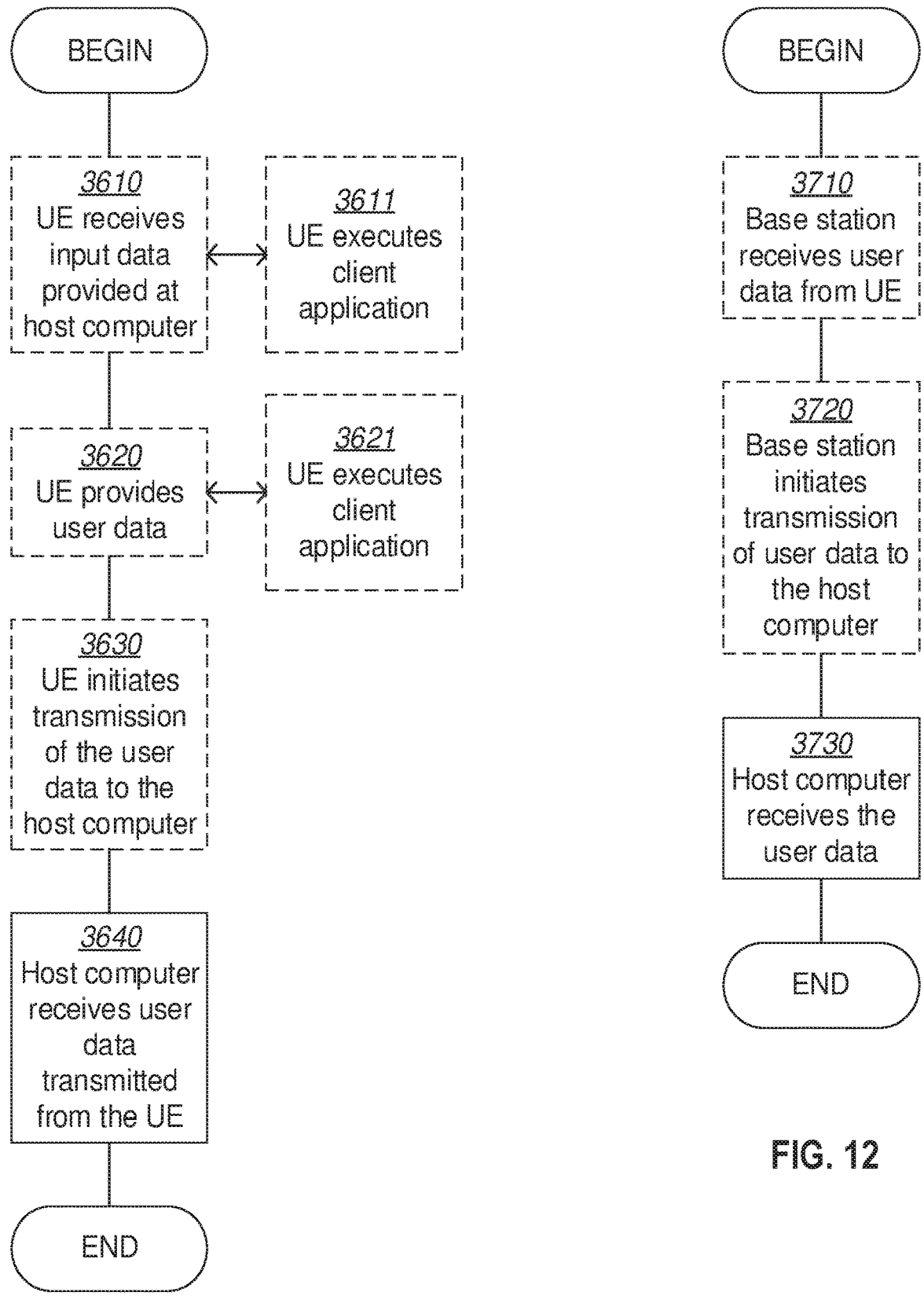

NETWORK NODE AND METHOD PERFORMED THEREIN FOR CONTROLLING TRANSMISSION

CROSS-REFERENCE TO RELATED APPLICATIONS

This application is a National stage of International Application No. PCT/CN2019/084018, filed Apr. 24, 2019, which is hereby incorporated by reference.

TECHNICAL FIELD

Embodiments herein relate to a network node and methods performed therein regarding wireless communication. In particular, embodiments herein relate to handling a communication session in a wireless communication network.

BACKGROUND

In a typical wireless communications network, wireless devices, also known as wireless communication devices, mobile stations, stations (STA) and/or user equipment (UE), communicate via a Radio Access Network (RAN) with one or more core networks (CN). The RAN covers a geographical area which is divided into service areas or cell areas, with each service area or cell area being served by access point such as an access node e.g. a Wi-Fi access point or other access points. The service area or cell area is a geographical area where radio coverage is provided by an access point and notification may be provided by a server pushing out notifications to the UE. The access point operates on radio frequencies to communicate over an air interface with the UE within range of the access point. The access point communicates over a downlink (DL) to the UE and the UE communicates over an uplink (UL) to the access point.

A Universal Mobile Telecommunications System (UMTS) is a third generation telecommunication network, which evolved from the second generation (2G) Global System for Mobile Communications (GSM). The UMTS terrestrial radio access network (UTRAN) is essentially a RAN using wideband code division multiple access (WCDMA) and/or High-Speed Packet Access (HSPA) for communication with user equipment. In a forum known as the Third Generation Partnership Project (3GPP), telecommunications suppliers propose and agree upon standards for present and future generation networks and UTRAN specifically, and investigate enhanced data rate and radio capacity. In some RANs, e.g. as in UMTS, several access points may be connected, e.g., by landlines or microwave, to a controller node, such as a radio network controller (RNC) or a base station controller (BSC), which supervises and coordinates various activities of the plural access points connected thereto. The RNCs are typically connected to one or more core networks.

Specifications for the Evolved Packet System (EPS) have been completed within the 3GPP and this work continues in the coming 3GPP releases, such as 4G and 5G networks such as New Radio (NR). The EPS comprises the Evolved Universal Terrestrial Radio Access Network (E-UTRAN), also known as the Long-Term Evolution (LTE) radio access network, and the Evolved Packet Core (EPC), also known as System Architecture Evolution (SAE) core network. E-UTRAN/LTE is a 3GPP radio access technology wherein the access points are directly connected to the EPC core network. As such, the Radio Access Network (RAN) of an EPS has an essentially "flat" architecture comprising access points connected directly to one or more core networks.

With the emerging 5G technologies such as new radio (NR), the use of very many transmit- and receive-antenna elements is of great interest as it makes it possible to utilize beamforming, such as transmit-side and receive-side beamforming. Transmit-side beamforming means that the transmitter can amplify the transmitted signals in a selected direction or directions, while suppressing the transmitted signals in other directions. Similarly, on the receive-side, a receiver can amplify signals from a selected direction or directions, while suppressing unwanted signals from other directions.

An IP Multimedia Subsystem (IMS) network providing services such as voice over LTE (VoLTE) for the UE may comprise a Call Session Control Function (CSCF) node and a Home Subscriber Server (HSS). The CSCF node e.g. facilitates session initiation protocol (SIP) setup and teardown and the HSS plays the role of a location server in IMS, in addition to acting as an authentication, authorization, accounting (AAA) server. The CSCF node may comprise a number of distributed functions e.g. a proxy CSCF (P-CSCF) node, an Interrogating CSCF (I-CSCF) node, and a Serving CSCF (S-CSCF) node. The P-CSCF node acts as the entry point in the IMS network. All UE's in the IMS are attached to the P-CSCF node. The P-CSCF node is responsible for routing incoming SIP messages to an IMS registrar server. The P-CSCF node is also responsible for setting up IPSec Security associations with the UEs, thus ensuring secure access to the IMS. The I-CSCF node acts as an inbound SIP proxy server in the IMS. During IMS registrations, the I-CSCF node queries the HSS to select the appropriate S-CSCF node which can serve the UE. During IMS sessions, the I-CSCF node acts as the entry point to terminating session requests. The I-CSCF node routes the incoming session requests to the S-CSCF node of the called party. The S-CSCF node acts as a registrar server, and in some cases as a redirect server. The S-CSCF node facilitates the routing path for mobile originated or mobile terminated session requests. The S-CSCF node is the most processing intensive node of the IMS core network due to its initial filter criteria processing logic which enables IMS service control. The different nodes may be stand-alone nodes or be co-located in one or more nodes.

A push notification, also known as a server push notification, is the delivery of information to a computing device such as the UE from an application server (AS) where the request for the transaction is initiated by the AS rather than by an explicit request from a client at the UE. In order to save resources e.g., battery life of the UE, some UEs and operating systems will suspend applications when not used. In some cases, internal timers cannot be used to wake such applications, nor will incoming network traffic wake the application. Instead, one way to wake the application is by using a Push Notification Service (PNS). Typically, each operating system uses a dedicated PNS. For example, some devices may use the Apple Push Notification service (APNs) while other devices may use a service called the Firebase Cloud Messaging (FCM) service.

The 3GPP has defined the push notification in the P-CSCF node which supports sending push notification to a push service. The push notification is used to wake up the client in the UE for terminating service such as terminating calls for WiFi calling:

P-CSCF node is responsible for sending the push request to the "push service" AS to wake up the application when there is a terminating request targeted to that application, or when the P-CSCF node wants to wake up the application for re-registration;

Following information is conveyed by the registering IMS application to the P-CSCF node at IMS registration:

The address of the "push service" AS.

Additional information required by the device vendor to identify the application.

When there is an incoming request targeted for this IMS application, the P-CSCF node constructs a push notification request and sends it to the "push service" AS. The AS sends the request to the target UE and wakes up the target application of the UE. This results in the IMS application re-registering in IMS and subsequently receiving the incoming request and handling the request accordingly.

IMS, which is one of the most complex Network Functions Virtualization (NFV) instances requires extremely low end-to-end latency, e.g. up to 40 msec, in order to be considered acceptable for subscribers.

However, the push notification mechanism may require a user agent (UA) to get the application re-registered at the IMS core after the application is awaken by the PNS, then re-establish the transport connection and then only the terminating INVITE can be forwarded by P-CSCF node to the UE which inherently delays the call setup procedures and establishment. Hence, the push notification mechanism adds latency to the end-to-end call setup.

SUMMARY

An object herein is to provide a mechanism to enable and/or handle communication in an efficient manner in a wireless communications network.

According to an aspect the object is achieved, according to embodiments herein, by providing a method performed by a network node for handling a communication session in a wireless communication network. The network node receives from a UE a registration message for re-registering the UE to a session. The network node then verifies the registration message based on registration information previously stored for the UE: and in case verified and in response to the reception, the network node transmits back to the UE, a registration response along with a terminating request for a call establishment.

According to another aspect the object is achieved, according to embodiments herein, by providing a network node for handling a communication session in a wireless communication network. The network node is configured to receive from a UE a registration message for re-registering the UE to a session. The network node is further configured to verify the registration message based on registration information previously stored for the UE: and in case verified and in response to the reception, the network node is configured to transmit back to the UE, a registration response along with a terminating request for a call establishment.

It is furthermore provided herein a computer program product comprising instructions, which, when executed on at least one processor, cause the at least one processor to carry out the method above, as performed by the network node. It is additionally provided herein a computer-readable storage medium, having stored thereon a computer program product comprising instructions which, when executed on at least one processor, cause the at least one processor to carry out the method according to the methods above, as performed by the network node.

Embodiments herein provide a mechanism that can reduce the end to end session latency in a calling scenario where push notification is used. For a terminating service towards a UE, where the network node, such as the P-CSCF node, itself can handle the re-registration sent by the UE without the need to wait for an acknowledgment of the core IMS for the registration to be successful and the network node can forward the buffered terminating request directly towards the UE as soon as it receives re-registration.

The mechanism enables the network node to receive the registration message such as a re-REGISTER message from the UE and send the response back to the UE based on the "previously stored record", i.e. previously stored registration information, and forward the terminating request, such as a terminating INVITE, to the UE and at the same time the UE may forward the re-REGISTER to the core IMS.

Embodiments herein have one or more advantages such as: significant improvement in the end-to-end latency in the push notification call scenario; accelerated establishment of call session setup; and/or user friendly experience due to the improvement in latency during call establishment.

BRIEF DESCRIPTION OF THE DRAWINGS

Embodiments will now be described in more detail in relation to the enclosed drawings, in which:

FIG. 9 shows methods implemented in a communication system including a host computer, a base station and a user equipment in accordance with some embodiments;

FIG. 10 shows methods implemented in a communication system including a host computer, a base station and a user equipment in accordance with some embodiments;

FIG. 11 shows methods implemented in a communication system including a host computer, a base station and a user equipment in accordance with some embodiments; and FIG. 12 shows methods implemented in a communication system including a host computer, a base station and a user equipment in accordance with some embodiments.

DETAILED DESCRIPTION

Figure 1:
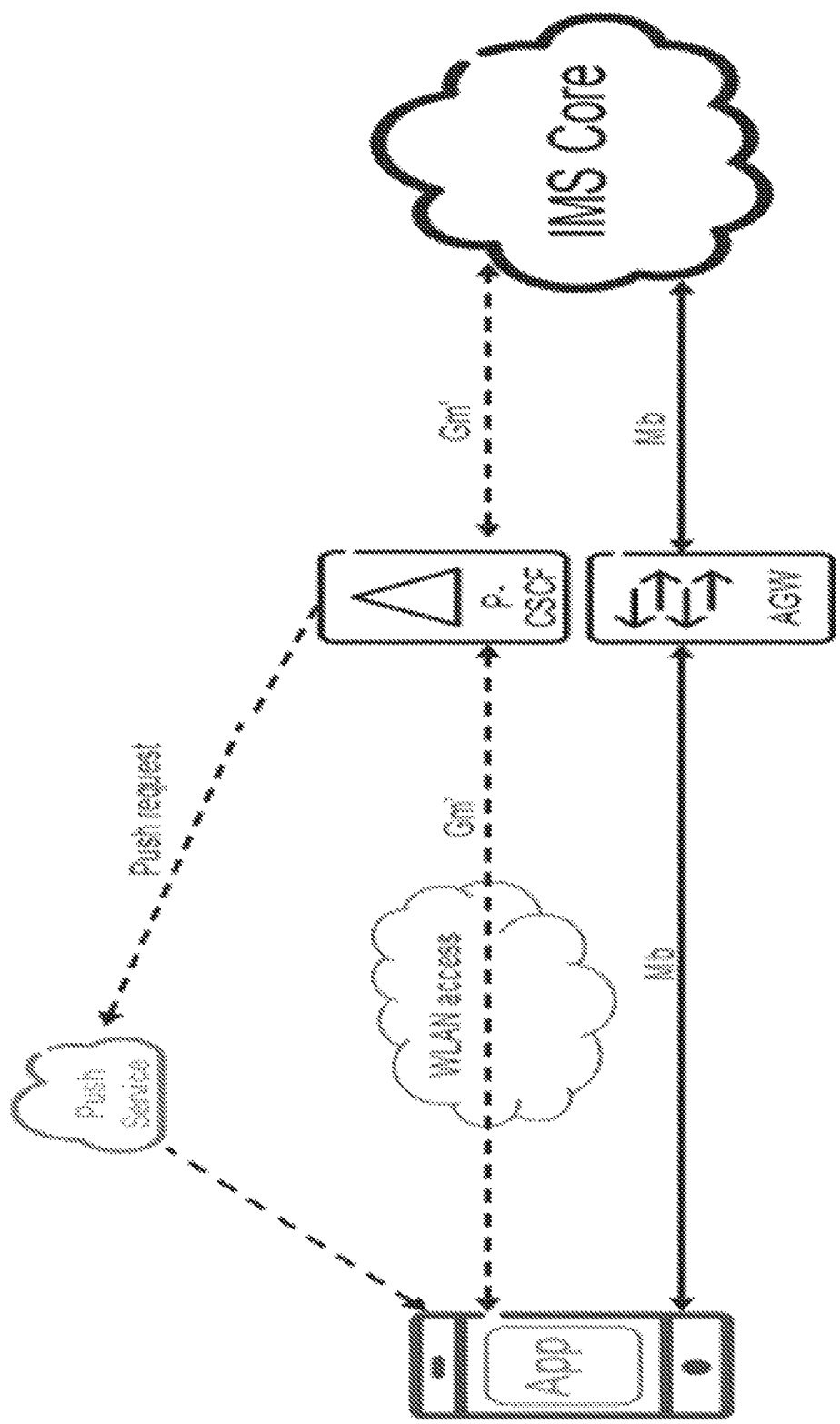
FIG. 1 shows an overview depicting a push notification setup.
Figure 2:
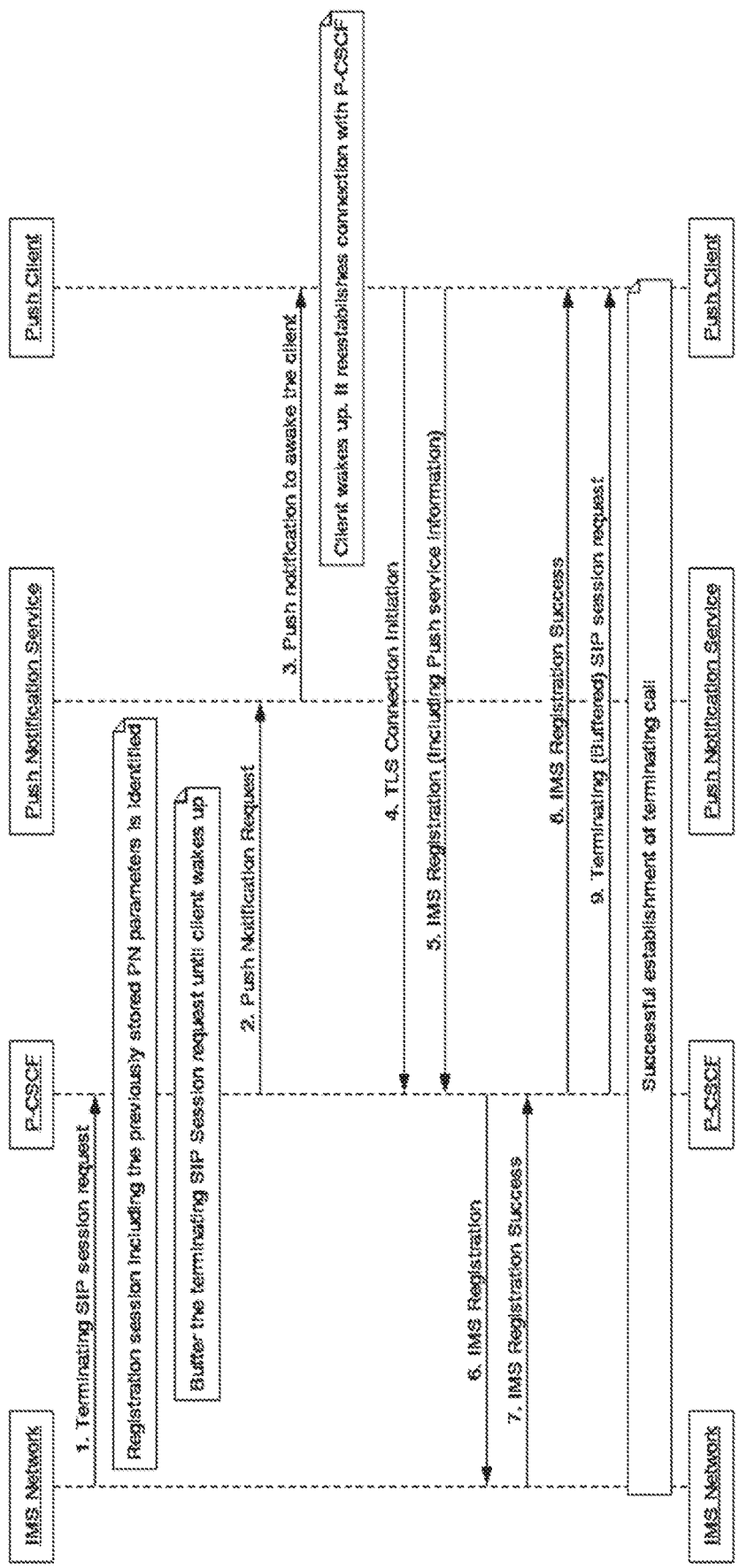
FIG. 2 shows a signalling scheme for re-registering a UE according to prior art.
Figure 3:
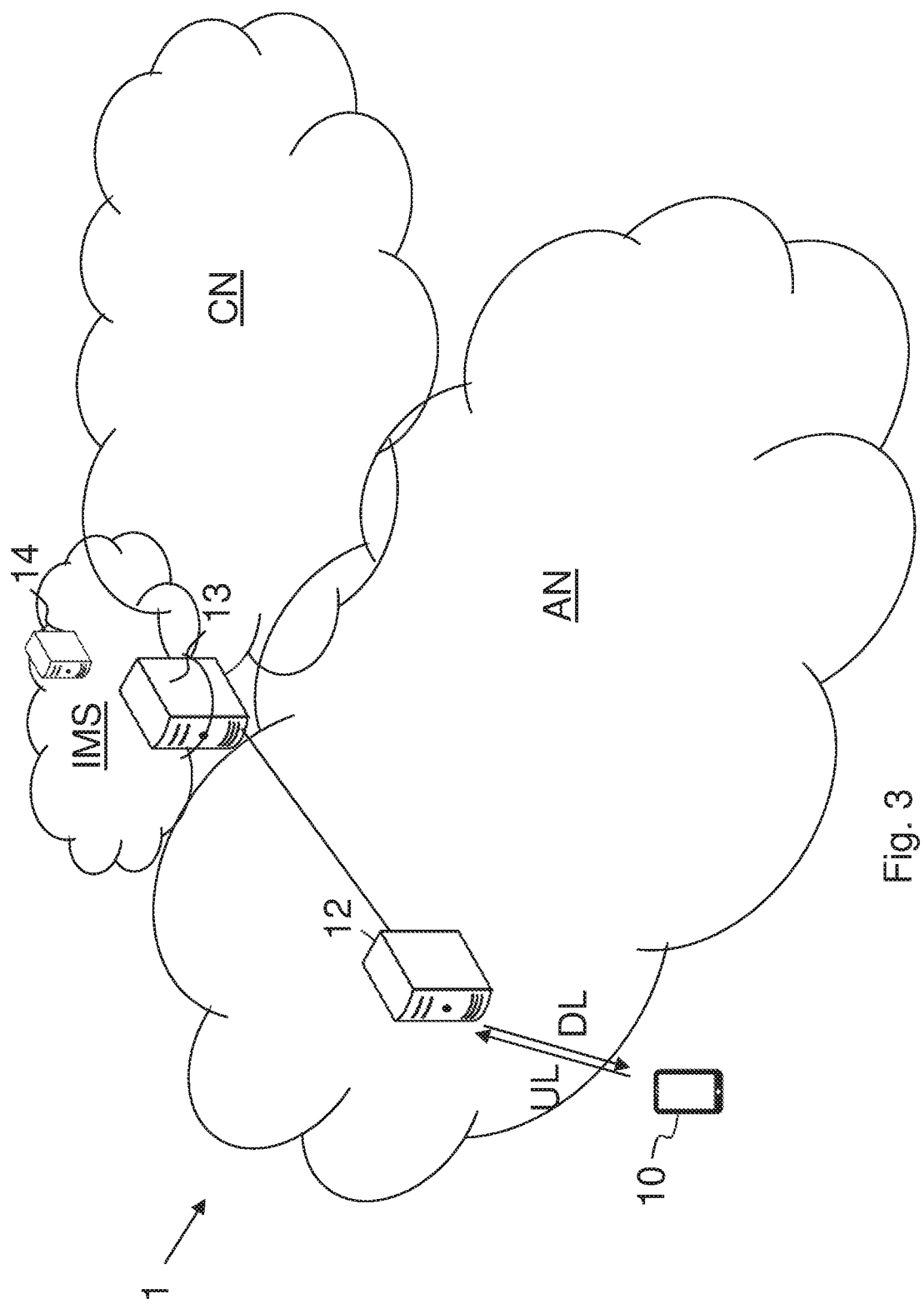
FIG. 3 is a schematic overview depicting a wireless communications network according to embodiments herein.

Embodiments herein relate to wireless communications networks in general. FIG. 3 is a schematic overview depicting a wireless communications network 1. The wireless communications network 1 comprises one or more RANs and one or more CNs. The wireless communications network 1 may use one or a number of different technologies. Embodiments herein relate to recent technology trends that are of particular interest in a New Radio (NR) context, however, embodiments are also applicable in further development of existing wireless communications systems such as e.g. LTE or Wideband Code Division Multiple Access (WCDMA).

In the wireless communications network 1, a UE 10 such as a mobile station, a non-access point (non-AP) STA, a STA, a wireless device and/or a wireless terminal, is comprised communicating via e.g. one or more Access Networks (AN), e.g. RAN, to one or more core networks (CN). It should be understood by the skilled in the art that "wireless device" is a non-limiting term which means any terminal, wireless communications terminal, user equipment, NB-IoT device, Machine Type Communication (MTC) device, Device to Device (D2D) terminal, or node e.g. smart phone, laptop, mobile phone, sensor, relay, mobile tablets or even a small base station capable of communicating using radio communication with a access point within an area served by the access point.

The wireless communications network 1 comprises a push server 12 providing notifications to UEs over a geographical area such as one or more cells. The notification may be transmitted from the push server 12 to the UE 10 via an access point also denoted as the radio network node which may be a transmission and reception point such as an access node, an access controller, a WiFi access node, a base station, e.g. a radio base station such as a gNodeB (gNB), an evolved Node B (eNB, eNode B), a base transceiver station, a radio remote unit, an Access Point Base Station, a base station router, a Wireless Local Area Network (WLAN) access point or an Access Point Station (AP STA), a transmission arrangement of a radio base station, a stand-alone access point or any other network unit or node capable of communicating with a wireless device within the area served by the access point depending e.g. on the first radio access technology and terminology used. The access point may be referred to as a serving access point wherein the service area may be referred to as a serving cell, and the serving network node communicates with the wireless device in form of DL transmissions to the wireless device and UL transmissions from the wireless device. It should be noted that a service area may be denoted as cell, beam, beam group or similar to define an area of radio coverage.

The wireless communications network 1 further comprises a network node 13 such as a IMS node e.g. a call session control function node that facilitates session setup and/or teardown such as session initiation protocol (SIP) setup and teardown. The network node 13 may be a P-CSCF node. The network node 13 is further connected to the IMS and a core IMS node 14 such as I-CSCF node, S-CSCF node or similar.

Embodiments herein relate to communication sessions such as calls, wherein a communication session is e.g. a protocol data unit session establishment or a flow establishment for a radio bearer such as a media bearer.

Embodiments herein are described within the context of 3GPP New radio (NR) radio technology see e.g. 3GPP TS 38.300 V15.2.0 (2018-06). It is understood that the embodiments herein are equally applicable to wireless access networks and UEs implementing other access technologies and standards. NR is used as an example technology in the embodiments herein, and using NR in the description therefore is particularly useful for understanding the problem and solutions solving the problem. In particular, the embodiments herein are applicable also to 3GPP LTE, or 3GPP LTE and NR integration, also denoted as non-standalone NR.

Embodiments herein propose a solution which significantly improves the end to end latency and accelerates the establishment of terminating session for a push notification scenario by handling, in parallel, the registration and terminating request session between the IMS core and the UE 10 woken up using a push service.

Figure 4A:
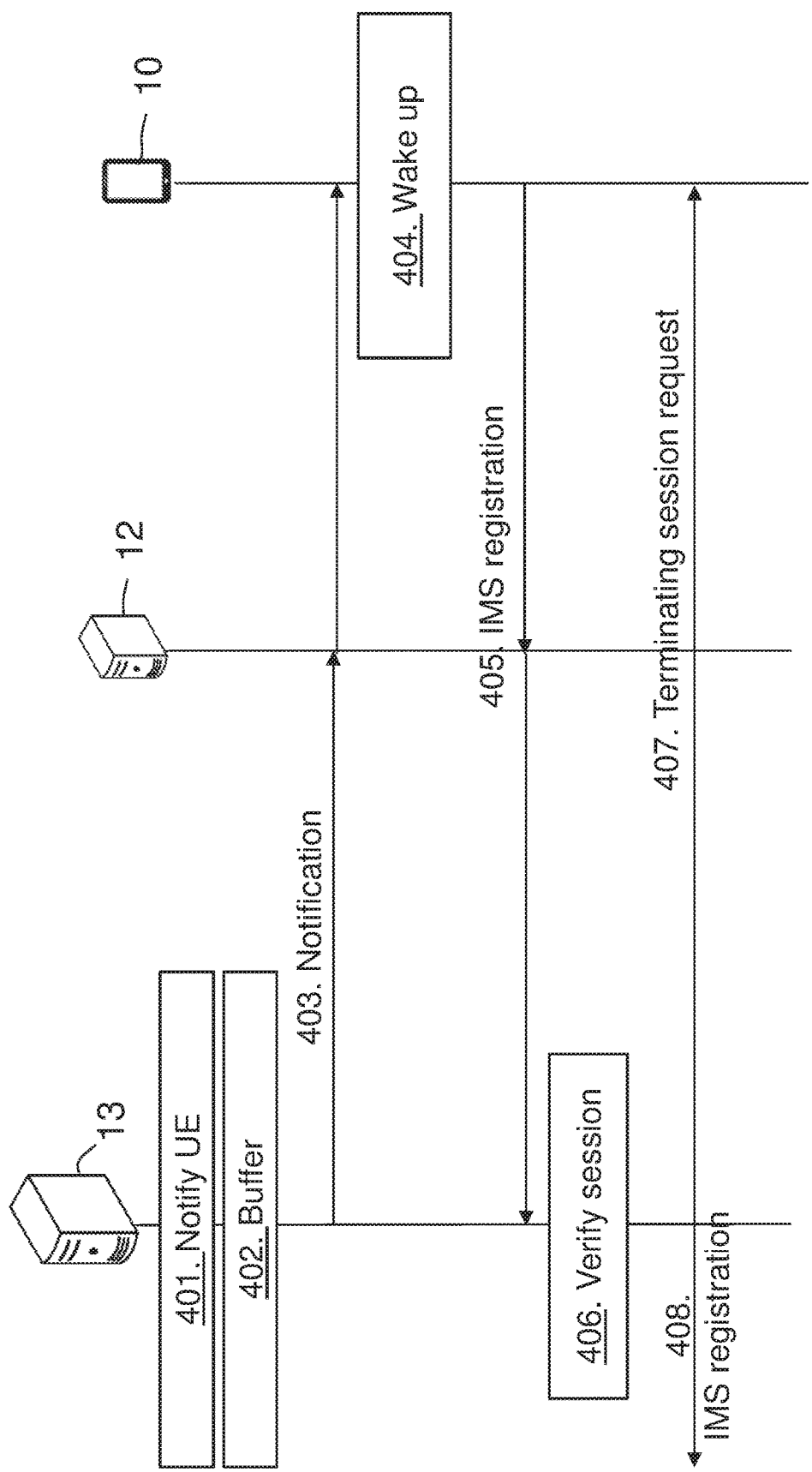
FIG. 4a is a combined flowchart and signalling scheme according to some embodiments herein.

FIG. 4*a* is a combined flowchart and signalling scheme according to some embodiments herein for controlling transmission of one or more data packets in the wireless communication network.

Action 401. The network node 13 may determine to notify the UE 10 to wake up the UE e.g. a terminating request for the UE arrives at the network node 13.

Action 402. The network node 13 may further buffer the terminating request and/or registration information of the UE 10.

Action 403. The network node 13 may transmit notify message e.g. to a push server. Thus, a notification may be forwarded to the push server 12 such as the push notification service (PNS).

Action 404. The push server 12 connects to the UE 10 via the proprietary interface and wakes up the client of the UE 10.

Action 405. The UE 10 initiates the setting up of transport connection e.g. transport layer security (TLS) towards network node 13 and sends a registering message to the network node 13 for re-registering the UE 10 to a session.

Action 406. The network node 13 verifies the UE 10 by comparing the re-registration message with the previously stored registration information of the UE 10, e.g. the previous registered session/registered data. The push notification parameter is used before to send one or more push notifications to the UE 10. Thus, the network node 13 verifies the registration message from the UE 10 based on the registration information previously stored for the UE 10.

Action 407. The network node 13, in case verified and in response to the reception of the registering message, transmits back to the UE 10, a registration response along with the buffered terminating request for a call establishment.

Action 408. The network node 13 may further inform the core IMS node 14 about a re-registering of the UE 10 in parallel, i.e. at a same time, with the transmitting of the registration response along with the terminating request. Thus, the call establishment of the terminating request towards the UE 10 does not explicitly wait for a re-registering response from the core IMS node.

It is herein defined a mechanism that can reduce the end to end latency in a push notification scenario for terminating services towards the UE 10, wherein the network node 13 itself can handle the re-registration sent by the UE 10 without the need to wait for an acknowledgment (ACK) of the core IMS and the network node 13 can forward the terminating request directly towards the UE 10 as soon as it receives re-registration that is verified at the network node 13.

The mechanism enables the network node 13 to receive re-REGISTER from the UE 10 and send the response back to UE 10 based on the "previously stored record" and forward the terminating INVITE to the UE 10 and at the same time, forward the re-REGISTER to the core IMS.

Figure 4B:
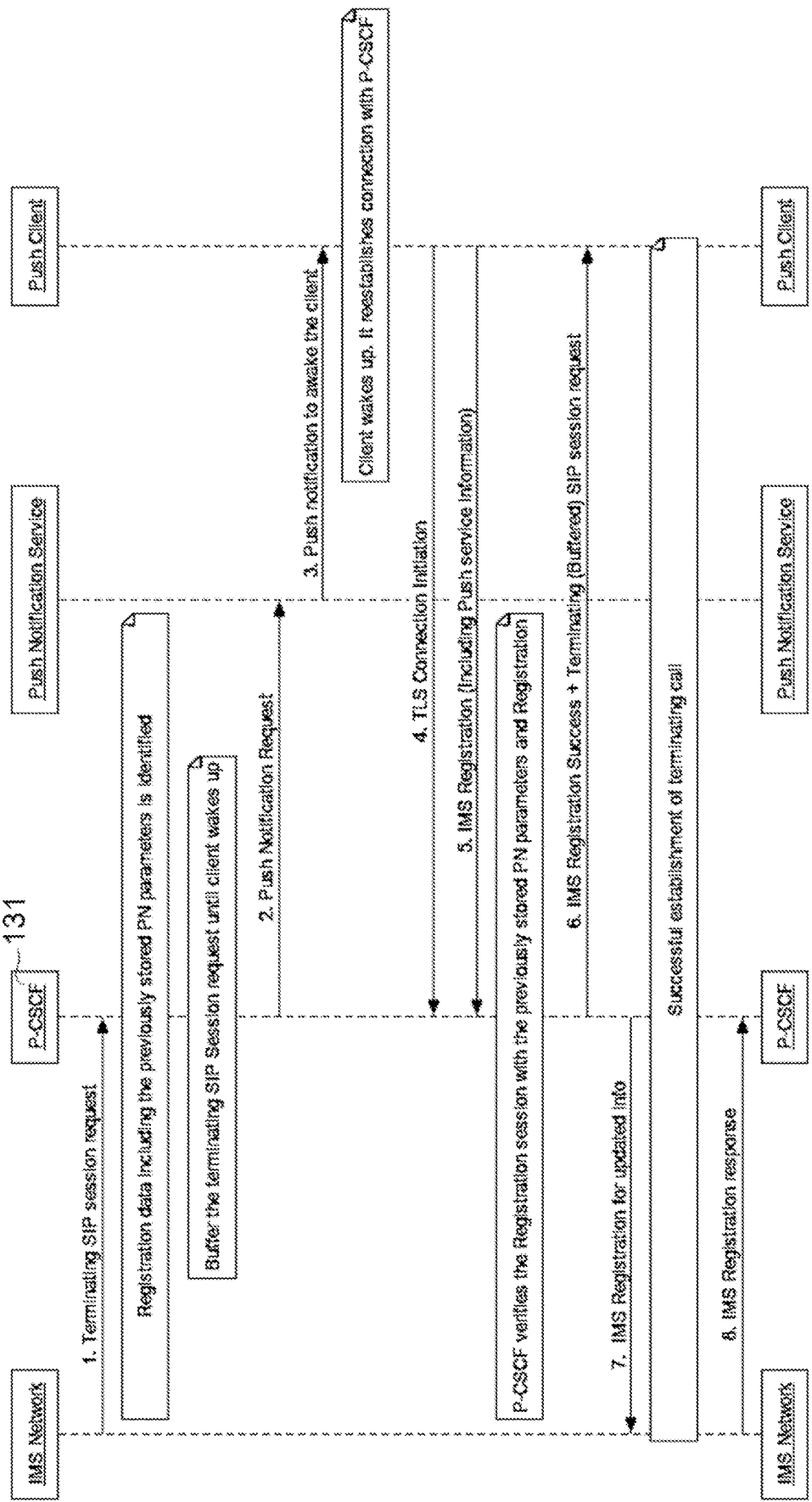
FIG. 4b is a combined flowchart and signalling scheme according to some embodiments herein.

A scenario is shown as FIG. 4*b* wherein the network node 13 is exemplified as a P-CSCF node 131.

The UE 10 is registered through the P-CSCF node 131 to the core IMS. After successful registration, the P-CSCF node 131 stores the registration information, also referred to as session information, of UE including PN parameters, registration data information and contact information.

Later when the UE 10 is in sleep mode and a terminating request arrives at the P-CSCF node 131, the terminating request is forwarded to the Push Notification Service (PNS). The PNS connects to the UE 10 via the proprietary interface and wakes up the client of the UE 10. The UE 10 then initiates the setting up of a connection e.g. a TLS connection towards the P-CSCF node 131 and sends e.g. a register message such as a SIP re-REGISTER.

The P-CSCF node 131 verifies the re-REGISTER session information with the previously stored PN parameters and initial/last REGISTER information such as pn-provider, pn-param and pn-Push Resource ID (prid) received in e.g. a contact header of a SIP REGISTER message. The P-CSCF node 131 immediately sends back the REGISTER response to the UE 10 along with a terminating INVITE request. The P-CSCF node 131 may also inform the core IMS about the re-REGISTER in parallel with the sending of INVITE to the UE 10. The call establishment of terminating session towards UE 10 doesn't explicitly wait for the re-REGISTER response from the core IMS or it also doesn't explicitly wait for the response (for re-REGISTER) to establish the call.

Figure 4C:
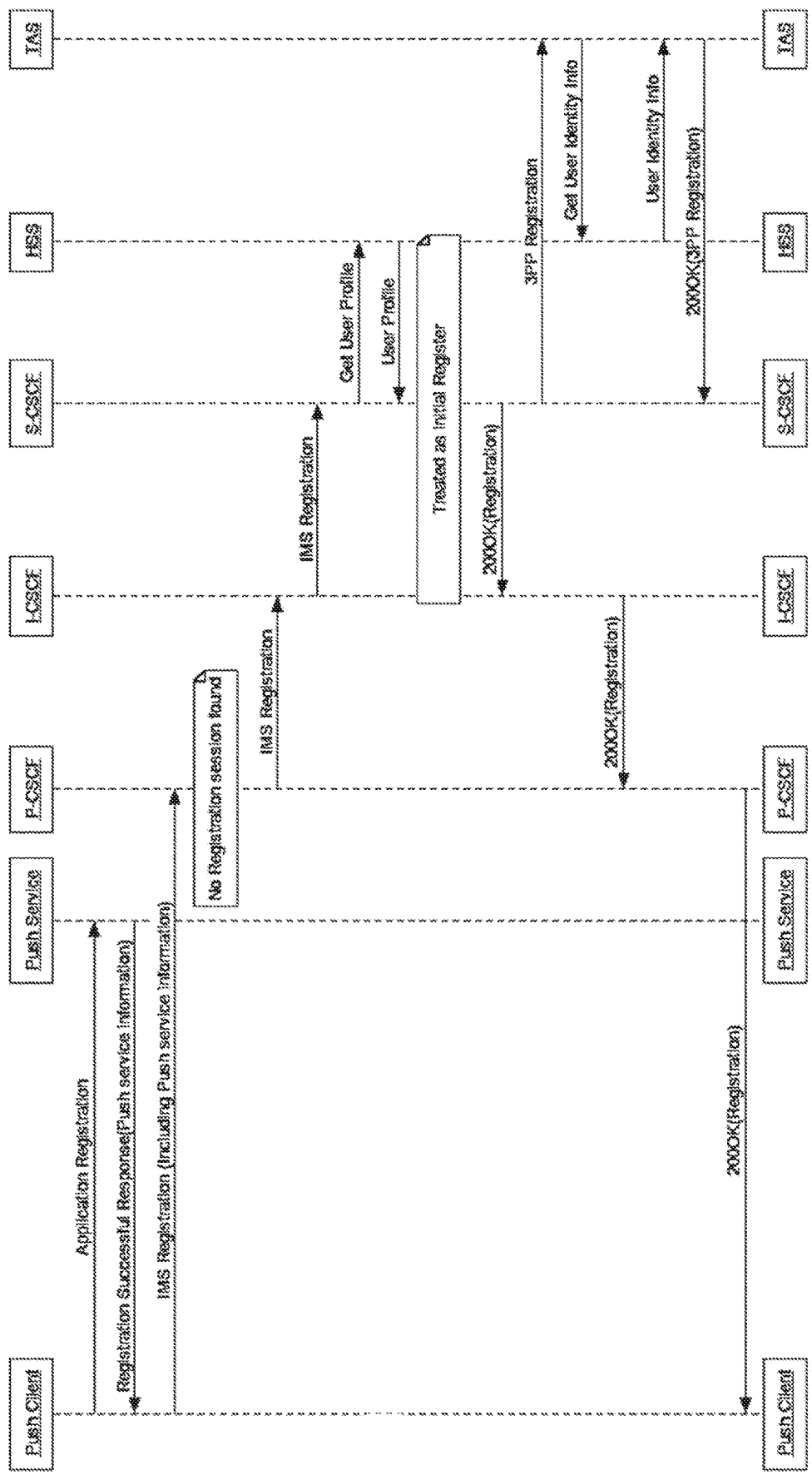
FIG. 4c is a combined flowchart and signalling scheme depicting registering to a push notification service.

FIG. 4c shows a push client registration. The sequence describes that the Push client registers through the network node such as a P-CSCF node with the IMS core network. During registration, the push function stores the information used for Push notification from the registration signalling. The illustrated scheme in FIG. 4c shows that the Push Client may forward an Application Registration to the Push Service. The Push Service may then forward a Registration Successful Response, e.g. Push Service Information, to the Push Client. The Push Client may then forward an IMS Registration, including the Push Service Information, to the P-CSCF node. When no registration session is found, the P-CSCF node may forward the IMS Registration to the I-CSCF node. The I-CSCF node may then forward the IMS Registration to the S-CSCF node. The S-CSCF node may forward a Get User Profile to the HSS. The HSS may then forward a User Profile to the S-CSCF node. When treated as an Initial Register, the S-CSCF node may forward a 200OK (Registration) to the I-CSCF node. The I-CSCF node may forward the 200OK (Registration) to the P-CSCF node. The P-CSCF node may then forward the 200OK (Registration) to the Push Client.

Figure 4D:
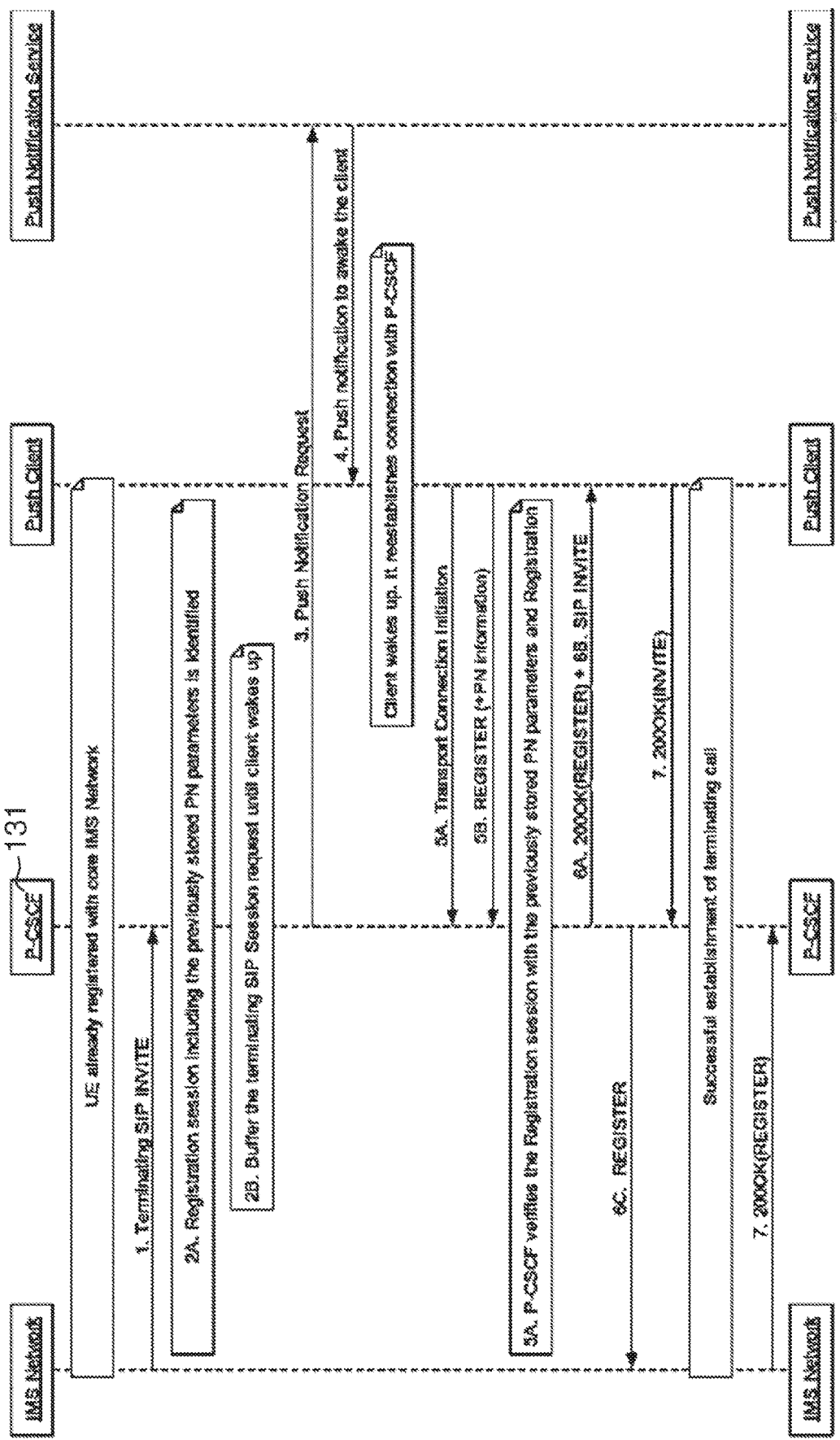
FIG. 4d is a combined flowchart and signalling scheme according to some embodiments herein.

FIG. 4d, which is similar to FIG. 4b, describes a complete signalling scenario wherein the network node 13 illustrated as a P-CSCF node 131 accelerates the establishment of terminating call setup sequence by handling register and invite session in parallel in both directions i.e. core and access network.

Signalling Sequences for SIP invite are illustrated but any terminating request, like MESSAGE, INFO, NOTIFY, INVITE may be used in embodiments herein:

The UE 10 has been already registered with the core IMS network and indicates its support for Push notification in an initial/previous SIP REGISTER message, see FIG. 4c.

1. IMS Core network forwards a terminating SIP INVITE request to the P-CSCF node 131 intended for a Push Client at the UE 10.
2. P-CSCF node 131 detects non-availability of a transport channel towards the UE or the client at the UE 10. P-CSCF node 131 verifies from the record of the UE 10 that the destined Client i.e. the UE 10 supports Push notification. The INVITE request is kept in a local buffer until a channel is open within a time interval.
3. P-CSCF node 131 sends a Push notification request to a push service such as Push Notification Service (PNS) depending on capability of the UE e.g. the Operating System of the UE 10.
4. PNS detects the location of the Client on its proprietary interface and awakes the client of the UE 10. The client then wakes up and the UE 10 tries to re-establish the transport connection with the P-CSCF node 131.
5. The UE initiates a connection establishment toward the P-CSCF node 131 like Transport Layer Security (TLS), transmission control protocol (TCP), and/or user datagram protocol (UDP) connection.

On successful transport connection, the client sends SIP (re) REGISTER towards P-CSCF node 131 including the Push Notification (PN) parameters. P-CSCF node 131 receives the (re) REGISTER from the client. The P-CSCF node 131 verifies all the attributes in the REGISTER and compares and matches with the previously stored register data or session data of the same client.

6. P-CSCF node 131 immediately responds with a 200OK for the REGISTER towards the Client if the registration message is validated locally in the P-CSCF node 131.

The P-CSCF node 131 forwards, in parallel with the 200OK, the buffered SIP INVITE request towards the client.

P-CSCF node 131 also informs the IMS Core network regarding the (re) REGISTER it receives from the client. The P-CSCF node 131 forwards this REGISTER to the core IMS node only if it finds a difference in any of the parameters compared to the previous/stored REGISTER session.

7. P-CSCF node 131 receives 200OK for INVITE from the client and the call gets established on a fast track.

The P-CSCF node 131 does not explicitly wait for the 200OK response for REGISTER from the IMS core in order to forward the SIP INVITE request to the client. This mechanism of handling multiple sessions in parallel, significantly reduces the end to end latency and accelerates the complete call establishment procedure.

Note: in case the registration to the core return with error code to reject the registration, the P-CSCF node 131 can either let the ongoing call finished or send a BYE to terminate the ongoing calls base on local policy.

The proposed solution is to define a mechanism that can reduce the end to end latency in a Push notification scenario for terminating services towards a UE, where the P-CSCF node itself can handle the re registration sent by the UE the without the need to wait for an acknowledgment of the core IMS and the P-CSCF node can forward the terminating request directly towards the UE as soon as it receives re-registration.

The mechanism enables the network node to receive re-REGISTER from the UE and send the response back to UE based on the "previously stored record" and forward the terminating INVITE to the UE and at the same time, may forward the re-REGISTER to the core IMS.

Figure 5:
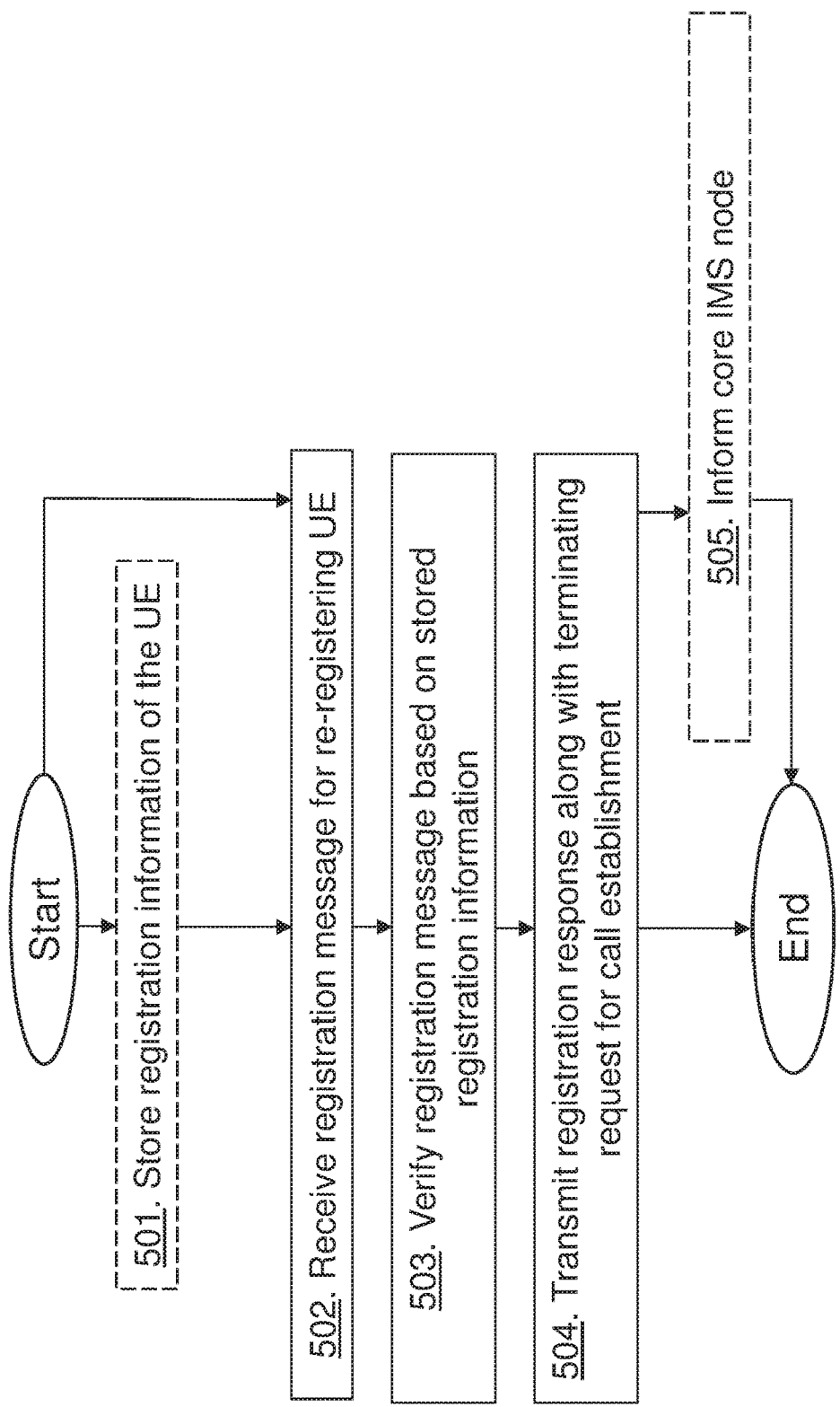
FIG. 5 is a schematic flowchart depicting a method performed by a network node according to embodiments herein.

The method actions performed by the network node 13, for handling a communication session in a wireless communication network according to embodiments herein will now be described with reference to a flowchart depicted in FIG. 5. The actions do not have to be taken in the order stated below, but may be taken in any suitable order. Actions performed in some embodiments are marked with dashed boxes.

Action 501. The network node 13 may store the registration information upon registration of the UE 10. The registration information of UE includes one or more of the following: push notification (PN) parameter, registration data and/or contact information for the UE. Thus, after successful registration, the network node 13 such as the network node 13 may store the registration information of UE including PN parameters, registration data such as session information, and contact information. Embodiments herein enable the network node 13 to be aware of the PN of the UE.

Action 502. The network node 13 receives from the UE 10 the registration message for re-registering the UE 10 to a session.

Action 503. The network node 13 verifies the registration message based on registration information previously stored for the UE 10. The registration information of UE may include one or more of the following: push notification parameter, registration data and/or contact information for the UE. I.e. the network node checks whether registration message comprises parameters that matches one or more of the previously stored registration information.

Action 504. The network node 13 further transmits, in case verified and in response to the reception, back to the UE 10, a registration response along with a terminating request for a call establishment.

Action 505. The network node 13 may inform i.e. transmit information, the core IMS node about a re-registering of the UE in parallel with the transmitting of the registration response along with the terminating request. The call establishment of the terminating request towards the UE 10 does not explicitly wait for a re-registering response from the core IMS node. It should be noted that the call establishment of the terminating request towards the UE 10 may not explicitly wait for a response for the re-registering of the UE 10 to establish the call.

Figure 6:
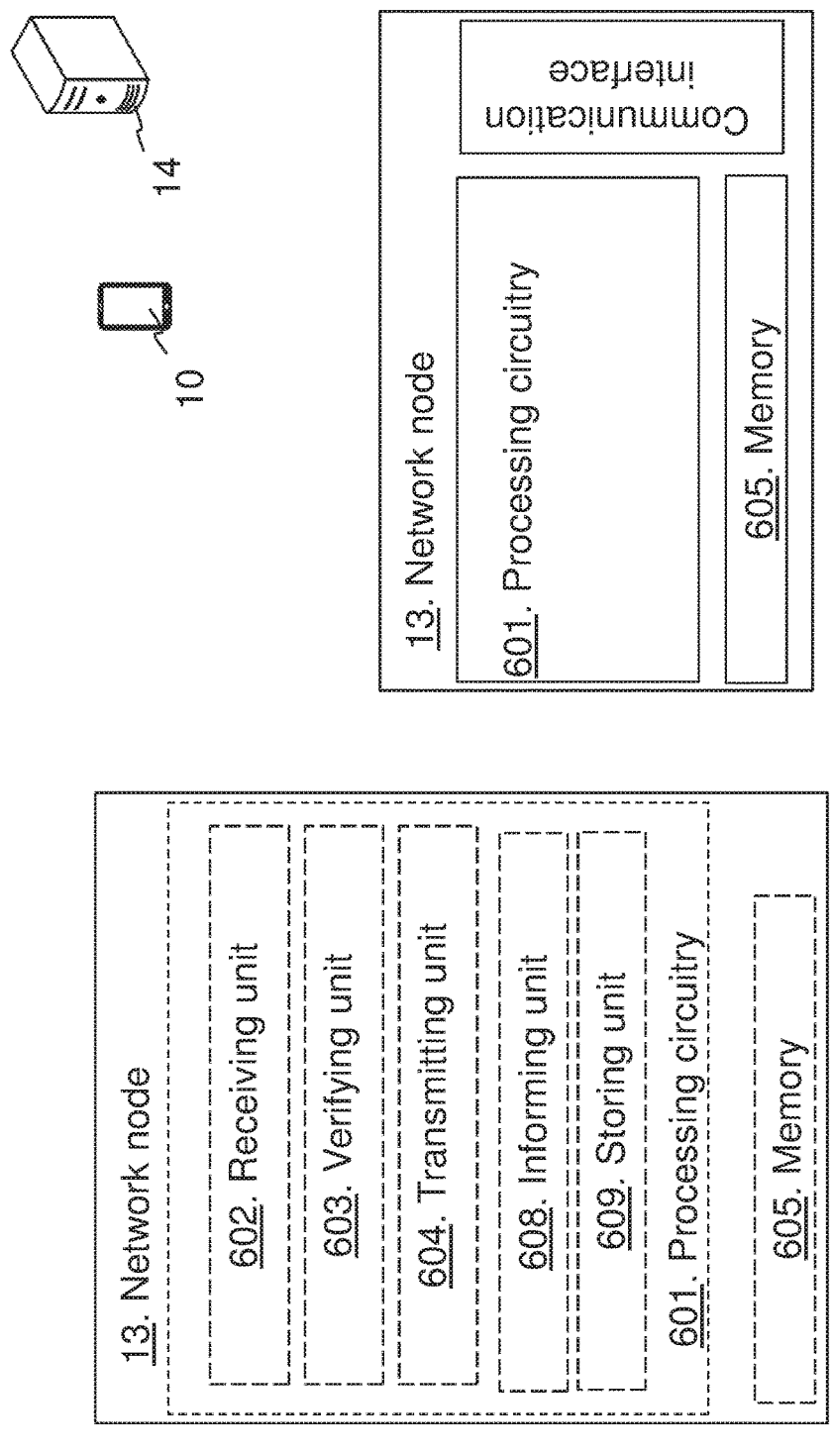
FIG. 6 is a block diagram depicting a network node according to embodiments herein.

FIG. 6 is a block diagram depicting the network node 13 in the wireless communication network 1 according to embodiments herein.

The network node 13 may comprise processing circuitry 601, e.g. one or more processors, configured to perform the methods herein.

The network node 13 may comprise a receiving unit 602, e.g. a receiver or a transceiver or module. The network node 13, the processing circuitry 601, and/or the receiving unit 602 is configured to receive from the UE 10 the registration message for re-registering the UE 10 to the session.

The network node 13 may comprise a verifying unit 603. The network node 13, the processing circuitry 601 and/or the verifying unit 603 is configured to verify the registration message based on registration information previously stored for the UE 10.

The registration information of the UE 10 may include one or more of the following: push notification parameter, registration session information and/or contact information for the UE 10.

The network node 13 may comprise a transmitting unit 604, e.g. a transmitter or a transceiver or module. The network node 13, the processing circuitry 601 and/or the transmitting unit 604 is configured to, in case verified and in response to the reception, transmit back to the UE 10, a registration response along with the terminating request for the call establishment.

The call establishment of the terminating request towards the UE 10 may not explicitly wait for the re-register response from the core IMS node 14.

The call establishment of the terminating request towards the UE 10 may not explicitly wait for the response for the re-registering to establish the call.

The network node 13 may comprise an informing unit 608. The network node 13, the processing circuitry 601 and/or the informing unit 608 may be configured to inform the core IMS node 14 about the re-register of the UE 10 in parallel with transmission of the registration response along with the terminating request.

The network node 13 may comprise a storing unit 609. The network node 13, the processing circuitry 601 and/or the storing unit 609 may be configured to store the registration information upon registration of the UE 10.

The network node 13 further comprises a memory 605. The memory comprises one or more units to be used to store data on, such as registration information, PN parameter, indications, requests, responses, applications to perform the methods disclosed herein when being executed, and similar. Furthermore, the network node may comprise a communication interface such as comprising a transmitter, a receiver and/or a transceiver and/or one or more antennas.

The methods according to the embodiments described herein for the network node are respectively implemented by means of e.g. a computer program product 606 or a computer program, comprising instructions, i.e., software code portions, which, when executed on at least one processor, cause the at least one processor to carry out the actions described herein, as performed by the network node 13. The computer program product 606 may be stored on a computer-readable storage medium 607, e.g. a disc, a universal serial bus (USB) stick or similar. The computer-readable storage medium 607, having stored thereon the computer program product, may comprise the instructions which, when executed on at least one processor, cause the at least one processor to carry out the actions described herein, as performed by the network node 13. In some embodiments, the computer-readable storage medium may be a transitory or a non-transitory computer-readable storage medium. Thus, embodiments herein may disclose a network node for controlling transmission of one or more data packets in a wireless communication network, wherein the network node comprises processing circuitry and a memory, said memory comprising instructions executable by said processing circuitry whereby said network node is operative to to perform any of the methods herein.

In some embodiments a more general term "access point" is used and it can correspond to any type of radio-network node or any network node, which communicates with a wireless device and/or with another network node. Examples of network nodes are NodeB, MeNB, SeNB, a network node belonging to Master cell group (MCG) or Secondary cell group (SCG), base station (BS), multi-standard radio (MSR) radio node such as MSR BS, eNodeB, network controller, radio-network controller (RNC), base station controller (BSC), relay, donor node controlling relay, base transceiver station (BTS), access point (AP), transmission points, transmission nodes, Remote radio Unit (RRU), Remote Radio Head (RRH), nodes in distributed antenna system (DAS), etc.

In some embodiments the non-limiting term wireless device or user equipment (UE) is used and it refers to any type of wireless device communicating with a network node and/or with another wireless device in a cellular or mobile communication system. Examples of UE are target device, device to device (D2D) UE, proximity capable UE (aka ProSe UE), machine type UE or UE capable of machine to machine (M2M) communication, Tablet, mobile terminals, smart phone, laptop embedded equipped (LEE), laptop mounted equipment (LME), USB dongles etc.

Embodiments are applicable to any RAT or multi-RAT systems, where the wireless device receives and/or transmit signals (e.g. data) e.g. New Radio (NR), Wi-Fi, Long Term Evolution (LTE), LTE-Advanced, Wideband Code Division Multiple Access (WCDMA), Global System for Mobile communications/enhanced Data rate for GSM Evolution (GSM/EDGE), Worldwide Interoperability for Microwave Access (WiMax), or Ultra Mobile Broadband (UMB), just to mention a few possible implementations.

As will be readily understood by those familiar with communications design, that functions means or circuits may be implemented using digital logic and/or one or more microcontrollers, microprocessors, or other digital hardware. In some embodiments, several or all of the various functions may be implemented together, such as in a single application-specific integrated circuit (ASIC), or in two or more separate devices with appropriate hardware and/or software interfaces between them. Several of the functions may be implemented on a processor shared with other functional components of a wireless device or network node, for example.

Alternatively, several of the functional elements of the processing means discussed may be provided through the use of dedicated hardware, while others are provided with hardware for executing software, in association with the appropriate software or firmware. Thus, the term "processor" or "controller" as used herein does not exclusively refer to hardware capable of executing software and may implicitly include, without limitation, digital signal processor (DSP) hardware and/or program or application data. Other hardware, conventional and/or custom, may also be included. Designers of communications devices will appreciate the cost, performance, and maintenance trade-offs inherent in these design choices.

Figure 7:
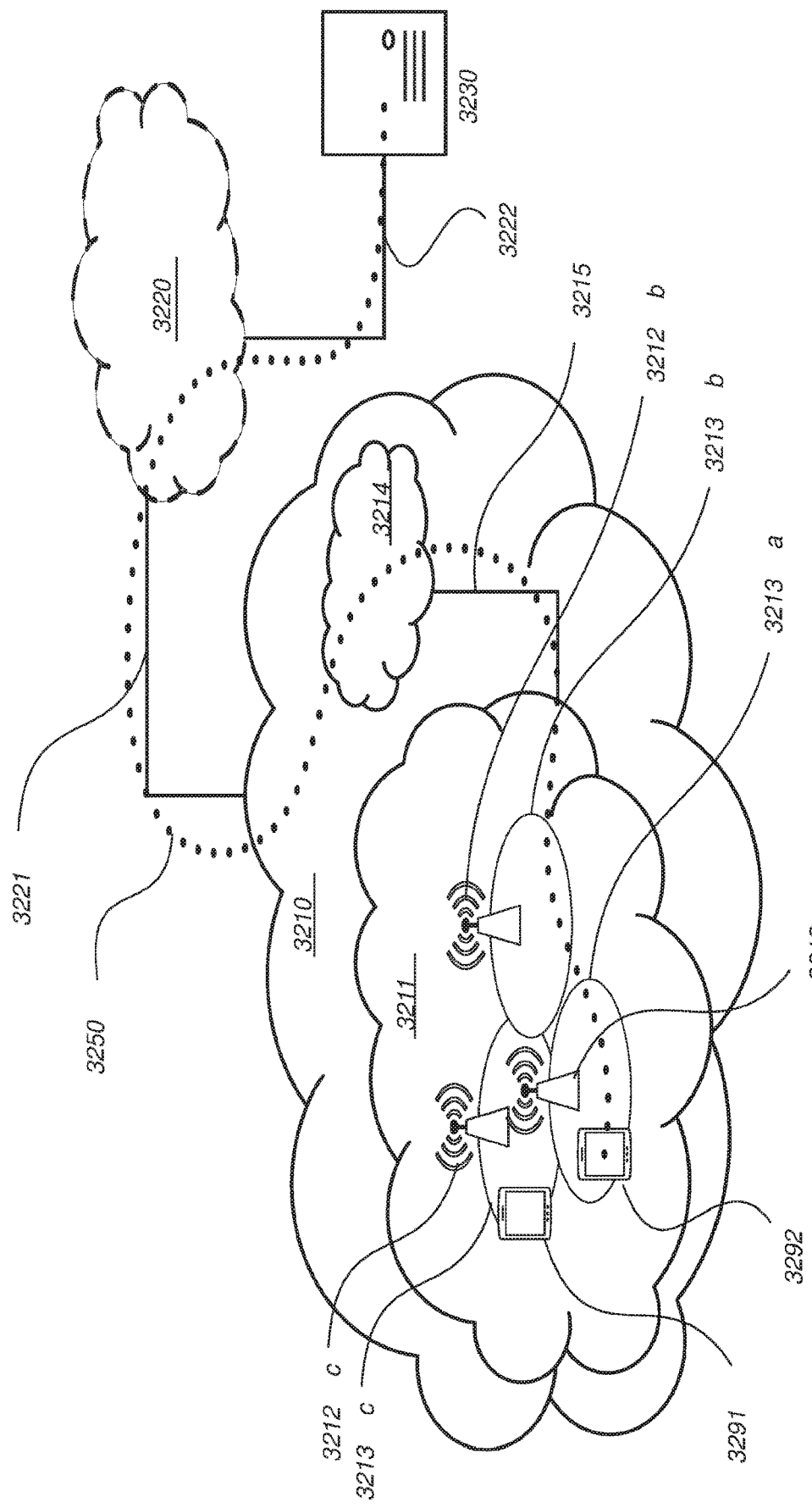
FIG. 7 shows a telecommunication network connected via an intermediate network to a host computer in accordance with some embodiments.

FIG. 7 shows a Telecommunication network connected via an intermediate network to a host computer in accordance with some embodiments. With reference to FIG. 7, in accordance with an embodiment, a communication system includes telecommunication network 3210, such as a 3GPP-type cellular network, which comprises access network 3211, such as a radio access network, and core network 3214. Access network 3211 comprises a plurality of base stations 3212a, 3212b, 3212c, such as NBs, eNBs, gNBs or other types of wireless access points being examples of the access point such as the push node 12 above, each defining a corresponding coverage area 3213a, 3213b, 3213c. Each base station 3212a, 3212b, 3212c is connectable to core network 3214 over a wired or wireless connection 3215. A first UE 3291 located in coverage area 3213c is configured to wirelessly connect to, or be paged by, the corresponding base station 3212c. A second UE 3292 in coverage area 3213a is wirelessly connectable to the corresponding base station 3212a. While a plurality of UEs 3291, 3292 are illustrated in this example being examples of the UE 10 above, the disclosed embodiments are equally applicable to a situation where a sole UE is in the coverage area or where a sole UE is connecting to the corresponding base station 3212.

Telecommunication network 3210 is itself connected to host computer 3230, which may be embodied in the hardware and/or software of a standalone server, a cloud-implemented server, a distributed server or as processing resources in a server farm. Host computer 3230 may be under the ownership or control of a service provider, or may be operated by the service provider or on behalf of the service provider. Connections 3221 and 3222 between telecommunication network 3210 and host computer 3230 may extend directly from core network 3214 to host computer 3230 or may go via an optional intermediate network 3220. Intermediate network 3220 may be one of, or a combination of more than one of, a public, private or hosted network; intermediate network 3220, if any, may be a backbone network or the Internet; in particular, intermediate network 3220 may comprise two or more sub-networks (not shown).

The communication system of FIG. 7 as a whole enables connectivity between the connected UEs 3291, 3292 and host computer 3230. The connectivity may be described as an over-the-top (OTT) connection 3250. Host computer 3230 and the connected UEs 3291, 3292 are configured to communicate data and/or signaling via OTT connection 3250, using access network 3211, core network 3214, any intermediate network 3220 and possible further infrastructure (not shown) as intermediaries. OTT connection 3250 may be transparent in the sense that the participating communication devices through which OTT connection 3250 passes are unaware of routing of uplink and downlink communications. For example, base station 3212 may not or need not be informed about the past routing of an incoming downlink communication with data originating from host computer 3230 to be forwarded (e.g., handed over) to a connected UE 3291. Similarly, base station 3212 need not be aware of the future routing of an outgoing uplink communication originating from the UE 3291 towards the host computer 3230.

Figure 8:
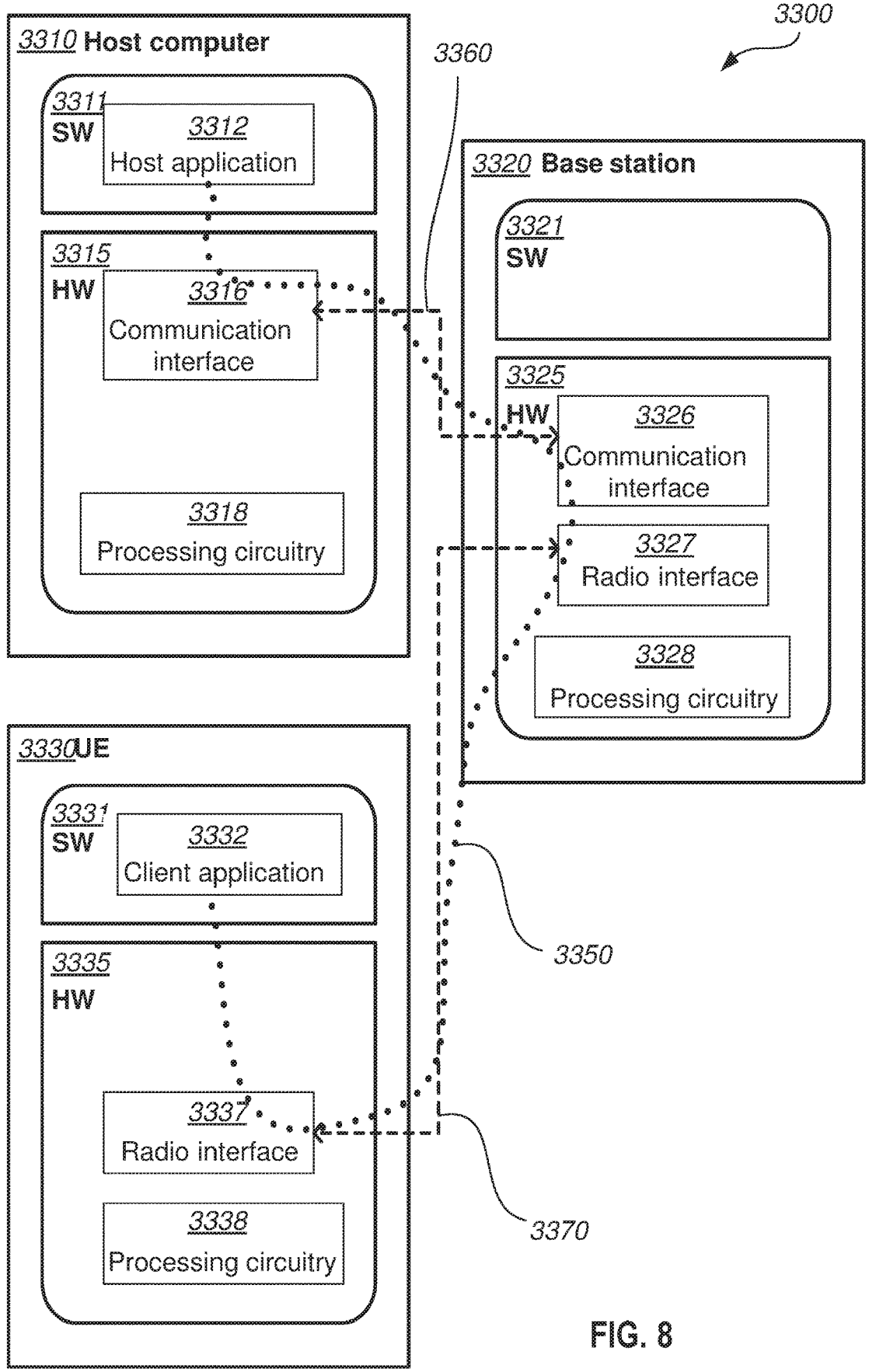
FIG. 8 shows a host computer communicating via a base station with a user equipment over a partially wireless connection in accordance with some embodiments.

FIG. 8: Host computer communicating via a base station with a user equipment over a partially wireless connection in accordance with some embodiments Example implementations, in accordance with an embodiment, of the UE, base station and host computer discussed in the preceding paragraphs will now be described with reference to FIG. 8. In communication system 3300, host computer 3310 comprises hardware 3315 including communication interface 3316 configured to set up and maintain a wired or wireless connection with an interface of a different communication device of communication system 3300. Host computer 3310 further comprises processing circuitry 3318, which may have storage and/or processing capabilities. In particular, processing circuitry 3318 may comprise one or more programmable processors, application-specific integrated circuits, field programmable gate arrays or combinations of these (not shown) adapted to execute instructions. Host computer 3310 further comprises software 3311, which is stored in or accessible by host computer 3310 and executable by processing circuitry 3318. Software 3311 includes host application 3312. Host application 3312 may be operable to provide a service to a remote user, such as UE 3330 connecting via OTT connection 3350 terminating at UE 3330 and host computer 3310. In providing the service to the remote user, host application 3312 may provide user data which is transmitted using OTT connection 3350.

Communication system 3300 further includes base station 3320 provided in a telecommunication system and comprising hardware 3325 enabling it to communicate with host computer 3310 and with UE 3330. Hardware 3325 may include communication interface 3326 for setting up and maintaining a wired or wireless connection with an interface of a different communication device of communication system 3300, as well as radio interface 3327 for setting up and maintaining at least wireless connection 3370 with UE 3330 located in a coverage area (not shown in FIG. 8) served by base station 3320. Communication interface 3326 may be configured to facilitate connection 3360 to host computer 3310. Connection 3360 may be direct or it may pass through a core network (not shown in FIG. 8) of the telecommunication system and/or through one or more intermediate networks outside the telecommunication system. In the embodiment shown, hardware 3325 of base station 3320 further includes processing circuitry 3328, which may comprise one or more programmable processors, application-specific integrated circuits, field programmable gate arrays or combinations of these (not shown) adapted to execute instructions. Base station 3320 further has software 3321 stored internally or accessible via an external connection.

Communication system 3300 further includes UE 3330 already referred to. It's hardware 3333 may include radio interface 3337 configured to set up and maintain wireless connection 3370 with a base station serving a coverage area in which UE 3330 is currently located. Hardware 3333 of UE 3330 further includes processing circuitry 3338, which may comprise one or more programmable processors, application-specific integrated circuits, field programmable gate arrays or combinations of these (not shown) adapted to execute instructions. UE 3330 further comprises software 3331, which is stored in or accessible by UE 3330 and executable by processing circuitry 3338. Software 3331 includes client application 3332. Client application 3332 may be operable to provide a service to a human or non-human user via UE 3330, with the support of host computer 3310. In host computer 3310, an executing host application 3312 may communicate with the executing client application 3332 via OTT connection 3350 terminating at UE 3330 and host computer 3310. In providing the service to the user, client application 3332 may receive request data from host application 3312 and provide user data in response to the request data. OTT connection 3350 may transfer both the request data and the user data. Client application 3332 may interact with the user to generate the user data that it provides.

It is noted that host computer 3310, base station 3320 and UE 3330 illustrated in FIG. 8 may be similar or identical to host computer 3230, one of base stations 3212a, 3212b, 3212c and one of UEs 3291, 3292 of FIG. 7, respectively. This is to say, the inner workings of these entities may be as shown in FIG. 8 and independently, the surrounding network topology may be that of FIG. 7.

In FIG. 8, OTT connection 3350 has been drawn abstractly to illustrate the communication between host computer 3310 and UE 3330 via base station 3320, without explicit reference to any intermediary devices and the precise routing of messages via these devices. Network infrastructure may determine the routing, which it may be configured to hide from UE 3330 or from the service provider operating host computer 3310, or both. While OTT connection 3350 is active, the network infrastructure may further take decisions by which it dynamically changes the routing (e.g., on the basis of load balancing consideration or reconfiguration of the network).

Wireless connection 3370 between UE 3330 and base station 3320 is in accordance with the teachings of the embodiments described throughout this disclosure. One or more of the various embodiments improve the performance of OTT services provided to UE 3330 using OTT connection 3350, in which wireless connection 3370 forms the last segment. More precisely, the teachings of these embodiments may improve the latency and thereby provide benefits such as reduced waiting time and better responsiveness.

A measurement procedure may be provided for the purpose of monitoring data rate, latency and other factors on which the one or more embodiments improve. There may further be an optional network functionality for reconfiguring OTT connection 3350 between host computer 3310 and UE 3330, in response to variations in the measurement results. The measurement procedure and/or the network functionality for reconfiguring OTT connection 3350 may be implemented in software 3311 and hardware 3315 of host computer 3310 or in software 3331 and hardware 3333 of UE 3330, or both. In embodiments, sensors (not shown) may be deployed in or in association with communication devices through which OTT connection 3350 passes; the sensors may participate in the measurement procedure by supplying values of the monitored quantities exemplified above, or supplying values of other physical quantities from which software 3311, 3331 may compute or estimate the monitored quantities. The reconfiguring of OTT connection 3350 may include message format, retransmission settings, preferred routing etc.; the reconfiguring need not affect base station 3320, and it may be unknown or imperceptible to base station 3320. Such procedures and functionalities may be known and practiced in the art. In certain embodiments, measurements may involve proprietary UE signaling facilitating host computer 3310's measurements of throughput, propagation times, latency and the like. The measurements may be implemented in that software 3311 and 3331 causes messages to be transmitted, in particular empty or 'dummy' messages, using OTT connection 3350 while it monitors propagation times, errors etc.

FIG. 9: Methods implemented in a communication system including a host computer, a base station and a user equipment in accordance with some embodiments.

FIG. 9 is a flowchart illustrating a method implemented in a communication system, in accordance with one embodiment. The communication system includes a host computer, a base station and a UE which may be those described with reference to FIGS. 7 and 8. For simplicity of the present disclosure, only drawing references to FIG. 9 will be included in this section. In step 3410, the host computer provides user data. In substep 3411 (which may be optional) of step 3410, the host computer provides the user data by executing a host application. In step 3420, the host computer initiates a transmission carrying the user data to the UE. In step 3430 (which may be optional), the base station transmits to the UE the user data which was carried in the transmission that the host computer initiated, in accordance with the teachings of the embodiments described throughout this disclosure. In step 3440 (which may also be optional), the UE executes a client application associated with the host application executed by the host computer.

FIG. 10: Methods implemented in a communication system including a host computer, a base station and a user equipment in accordance with some embodiments.

FIG. 10 is a flowchart illustrating a method implemented in a communication system, in accordance with one embodiment. The communication system includes a host computer, a base station and a UE which may be those described with reference to FIGS. 7 and 8. For simplicity of the present disclosure, only drawing references to FIG. 10 will be included in this section. In step 3510 of the method, the host computer provides user data. In an optional substep (not shown) the host computer provides the user data by executing a host application. In step 3520, the host computer initiates a transmission carrying the user data to the UE. The transmission may pass via the base station, in accordance with the teachings of the embodiments described throughout this disclosure. In step 3530 (which may be optional), the UE receives the user data carried in the transmission.

FIG. 11: Methods implemented in a communication system including a host computer, a base station and a user equipment in accordance with some embodiments.

FIG. 11 is a flowchart illustrating a method implemented in a communication system, in accordance with one embodiment. The communication system includes a host computer, a base station and a UE which may be those described with reference to FIGS. 7 and 8. For simplicity of the present disclosure, only drawing references to FIG. 11 will be included in this section. In step 3610 (which may be optional), the UE receives input data provided by the host computer. Additionally or alternatively, in step 3620, the UE provides user data. In substep 3621 (which may be optional) of step 3620, the UE provides the user data by executing a client application. In substep 3611 (which may be optional) of step 3610, the UE executes a client application which provides the user data in reaction to the received input data provided by the host computer. In providing the user data, the executed client application may further consider user input received from the user. Regardless of the specific manner in which the user data was provided, the UE initiates, in substep 3630 (which may be optional), transmission of the user data to the host computer. In step 3640 of the method, the host computer receives the user data transmitted from the UE, in accordance with the teachings of the embodiments described throughout this disclosure.

FIG. 12: Methods implemented in a communication system including a host computer, a base station and a user equipment in accordance with some embodiments.

FIG. 12 is a flowchart illustrating a method implemented in a communication system, in accordance with one embodiment. The communication system includes a host computer, a base station and a UE which may be those described with reference to FIGS. 7 and 8. For simplicity of the present disclosure, only drawing references to FIG. 12 will be included in this section. In step 3710 (which may be optional), in accordance with the teachings of the embodiments described throughout this disclosure, the base station receives user data from the UE. In step 3720 (which may be optional), the base station initiates transmission of the received user data to the host computer. In step 3730 (which may be optional), the host computer receives the user data carried in the transmission initiated by the base station.

Any appropriate steps, methods, features, functions, or benefits disclosed herein may be performed through one or more functional units or modules of one or more virtual apparatuses. Each virtual apparatus may comprise a number of these functional units. These functional units may be implemented via processing circuitry, which may include one or more microprocessor or microcontrollers, as well as other digital hardware, which may include digital signal processors (DSPs), special-purpose digital logic, and the like. The processing circuitry may be configured to execute program code stored in memory, which may include one or several types of memory such as read-only memory (ROM), random-access memory (RAM), cache memory, flash memory devices, optical storage devices, etc. Program code stored in memory includes program instructions for executing one or more telecommunications and/or data communications protocols as well as instructions for carrying out one or more of the techniques described herein. In some implementations, the processing circuitry may be used to cause the respective functional unit to perform corresponding functions according one or more embodiments of the present disclosure.

Modifications and other embodiments of the disclosed embodiments will come to mind to one skilled in the art having the benefit of the teachings presented in the foregoing descriptions and the associated drawings. Therefore, it is to be understood that the embodiment(s) is/are not to be limited to the specific embodiments disclosed and that modifications and other embodiments are intended to be included within the scope of this disclosure. Although specific terms may be employed herein, they are used in a generic and descriptive sense only and not for purposes of limitation.

ABBREVIATION EXPLANATION

NR New Radio
3GPP 3rd Generation Partnership Project
TS Technical Specification
UE User Equipment
LTE Long Term Evolution
DC Dual Connectivity
PDCP Packet Data Convergence Protocol
RLC Radio Link Controller
PHY Physical Layer
gNB g-Node-B
MN Master Node
SN Secondary Node
CU Centralized Unit
DU Distributed Unit
CA Carrier Aggregation
MAC Medium Access Protocol
URLLC Ultra-Reliable Low Latency
DRB Data Radio Bearer
PDU Protocol Data Unit
LCID Logical Channel ID
CE Control Element

The invention claimed is:

1. A method performed by a network node for handling a communication session in a wireless communication network, the method comprising
receiving from a user equipment (UE) a registration message for re-registering the UE to a session;
verifying the registration message based on registration information previously stored for the UE; and
in response to the receiving and verifying the registration message, transmitting back to the UE, a registration response along with a terminating request for a call establishment.

2. The method according to claim 1, further comprising:
informing a core IP Multimedia Subsystem (IMS) node about re-registering of the UE in parallel with the transmitting of the registration response along with the terminating request.

3. The method according to claim 2, wherein the call establishment of the terminating request towards the UE does not explicitly wait for a re-registering response from the core IMS node.

4. The method according to claim 2, wherein the call establishment of the terminating request towards the UE does not explicitly wait for a response for the re-registering of the UE to establish a call.

5. The method according to claim 1, further comprising:
storing the registration information upon registration of the UE.

6. The method according to claim 1, wherein the registration information of the UE includes one or more of the following: push notification parameter, registration session information, contact information for the UE, or any combination thereof.

7. A network node for handling a communication session in a wireless communication network, wherein the network node comprising:
- a processor; and
- a memory comprising instructions which, when executed by the processor, cause the network node to:
  - receive from a user equipment (UE) a registration message for re-registering the UE to a session;
  - verify the registration message based on registration information previously stored for the UE; and
  - in response to reception and verification of the registration message, transmit back to the UE, a registration response along with a terminating request for a call establishment.

8. The network node according to claim 7, wherein the network node is further configured to:
- inform a core IP Multimedia Subsystem (IMS) node about re-register of the UE in parallel with transmission of the registration response along with the terminating request.

9. The network node according to claim 8, wherein the call establishment of the terminating request towards the UE does not explicitly wait for a re-register response from the core IMS node.

10. The network node according to claim 8, wherein the call establishment of the terminating request towards the UE does not explicitly wait for a response for the re-registering to establish a call.

11. The network node according to claim 7, wherein the network node is further configured to store the registration information upon registration of the UE.

12. The network node according to claim 7, wherein the registration information of the UE includes one or more of the following: push notification parameter, registration session information, contact information for the UE, or any combination thereof.

13. A non-transitory computer-readable storage medium, having stored thereon a computer program product comprising instructions which, when executed on at least one processor, cause a network node for handling a communication session in a wireless communication network to perform operations comprising:
- receiving from a user equipment (UE) a registration message for re-registering the UE to a session;
- verifying the registration message based on registration information previously stored for the UE; and
- in response to the receiving and verifying the registration message, transmitting back to the UE, a registration response along with a terminating request for a call establishment.

14. The non-transitory computer-readable storage medium according to claim 13, wherein the instructions further cause the network node to perform operations comprising:
- informing a core IP Multimedia Subsystem (IMS) node about re-registering of the UE in parallel with the transmitting of the registration response along with the terminating request.

15. The non-transitory computer-readable storage medium according to claim 14, wherein the call establishment of the terminating request towards the UE does not explicitly wait for a re-registering response from the core IMS node.

16. The non-transitory computer-readable storage medium according to claim 14, wherein the call establishment of the terminating request towards the UE does not explicitly wait for a response for the re-registering of the UE to establish a call.

17. The non-transitory computer-readable storage medium according to claim 13, wherein the instructions further cause the network node to perform operations comprising:
- storing the registration information upon registration of the UE.

18. The non-transitory computer-readable storage medium according to claim 13, wherein the registration information of the UE includes one or more of the following: push notification parameter, registration session information, contact information for the UE, or any combination thereof.

* * * * *